B. M. PULLIAM.
Corn-Planter.

No. 222,421.  Patented Dec. 9, 1879.

WITNESSES
Nat. E. Oliphant
Geo. B. Porter

INVENTOR
Benjamin M. Pulliam,
per Chas. H. Fowler,
Attorney.

UNITED STATES PATENT OFFICE.

BENJAMIN M. PULLIAM, OF TOLONO, ILLINOIS.

IMPROVEMENT IN CORN-PLANTERS.

Specification forming part of Letters Patent No. 222,421, dated December 9, 1879; application filed May 8, 1879.

*To all whom it may concern:*

Be it known that I, BENJAMIN M. PULLIAM, of Tolono, in the county of Champaign and State of Illinois, have invented a new and valuable Improvement in Corn-Planters; and I do hereby declare that the following is a full, clear, and exact description of the construction and operation of the same, reference being had to the annexed drawings, making a part of this specification, and to the letters and figures of reference marked thereon.

Figure 1:
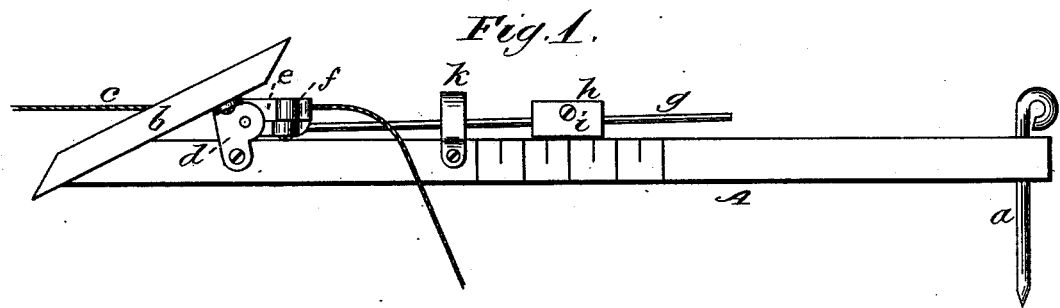
Figure 2:
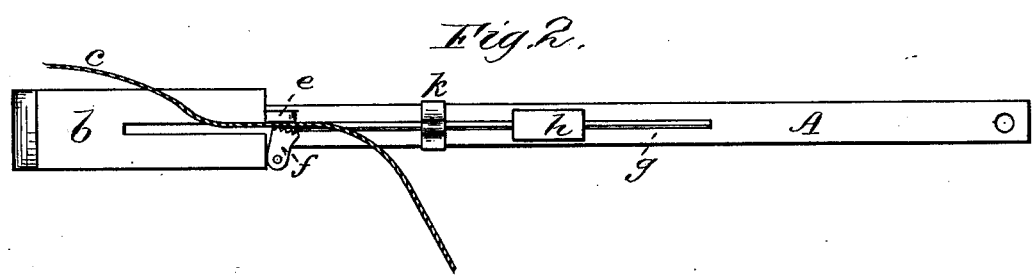
Figure 3:
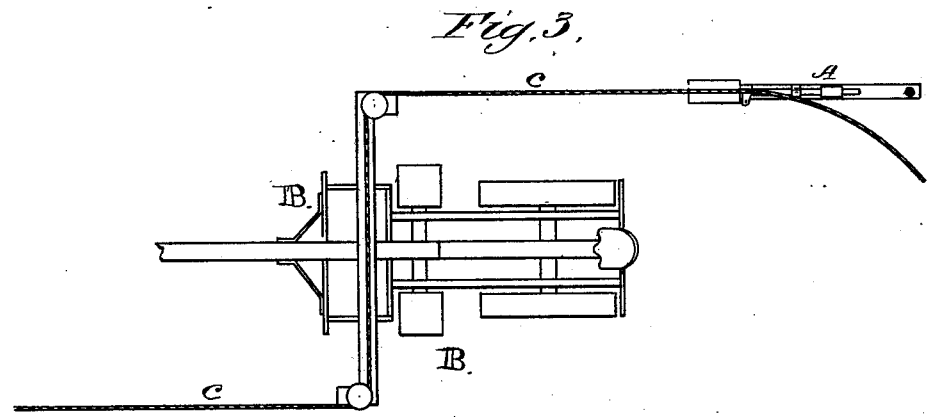

Figure 1 of the drawings is a representation of a side elevation of my invention. Fig. 2 is a top-plan view of the same. Fig. 3 is a view illustrating the application of my invention.

This invention has relation to check-row planters; and it consists in a novel construction of a device to be used in connection with a check-row cord, whereby the operator is enabled to keep the rope at one tension, without the necessity of dismounting, the construction and arrangement of the device being hereinafter described, and subsequently pointed out in the claims.

In the accompanying drawings, A represents the stake, secured in the ground by a suitable pin or other device, as represented at $a$. The stake A is provided at its outer or free end with a bifurcated or slotted elbow, $b$, disposed at an angle to the stake to form a guide for the rope $c$. Secured to the under side of the elbow $b$ and the sides of the stake A are bearing-plates $d$, which act as braces for the elbow, and also form bearings for the journals of a seat, $e$. To the seat $e$ is pivoted a serrated catch, $f$, to clamp and hold the rope $c$ between it and the seat, said seat having secured thereto a rod, $g$, which carries a suitable weight, $h$, capable of adjustment thereon by a set screw, $i$, the rod being limited in its upward movement by a stop, $k$.

To more clearly illustrate the application of my invention I have shown a corn-planter of the ordinary construction, as represented at B, provided with the usual pulley-bar, to which the rope or marker is connected.

The check-row cord being stretched across the field where it is desired to plant, and the rope or cord properly placed over the pulleys on the cross-bar of the corn-planter, as illustrated in Fig. 3 of the drawings, the operator proceeds with the planter and drives the same across the field, and at the point where it is desired to turn the pulley-arm or cross-bar will come in contact with the stake A and cause the rope to become detached therefrom and the elevated end of the stake to fall. When the planter is turned the driver or operator removes the stake to the other side of the same and draws back upon the rope, holding the stake until the weighted rod $g$ starts up, after which the stake is fastened to the ground and the operator returns across the field until coming in contact with the stake at the opposite side, when a like occurrence will take place.

The tension of the rope may be regulated by moving the weight $h$ along the rod $g$ any required distance, the scale upon the side of the stake indicating the amount of adjustment necessary to suit the various kinds of planters.

The bifurcated elbow $b$ holds the rope or cord $c$ at its ends and forms a guide for the same, while the catch $f$ firmly bears against the rope and clamps it between it and the seat $e$.

Having now fully described my invention, what I claim as new, and desire to secure by Letters Patent, is—

1. The combination, with the rope $c$, of the stake A, weighted rod $g$, serrated catch $f$, and seat $e$, substantially as and for the purpose set forth.

2. The stake A, rod $g$, adjustable weight $h$, and seat $e$, in combination with the bifurcated elbow $b$, catch $f$, and rope $c$, substantially as and for the purpose set forth.

In testimony that I claim the above I have hereunto subscribed my name in the presence of two witnesses.

BENJAMIN M. PULLIAM.

Witnesses:
WM. T. PULLIAM,
WILLIAM PULLIAM.